United States Patent [19]

Kalian

[11] 4,283,043
[45] Aug. 11, 1981

[54] CUTTING TORCH ATTACHMENT
[76] Inventor: Alan Kalian, 106 Harvard St., San Francisco, Calif. 94134
[21] Appl. No.: 84,405
[22] Filed: Oct. 12, 1979
[51] Int. Cl.³ .............................................. B23K 7/10
[52] U.S. Cl. ....................................... 266/66; 266/68; 266/70; 266/71; 266/76
[58] Field of Search ....................... 266/58, 66, 67, 68, 266/70, 71, 76

[56] References Cited
U.S. PATENT DOCUMENTS

| | | | |
|---|---|---|---|
| 1,495,994 | 6/1924 | Farmer | 266/70 |
| 1,552,061 | 9/1925 | Krebs | 266/58 |
| 2,170,305 | 8/1939 | Ingwersen | 266/66 |
| 2,483,294 | 9/1949 | Mimer | 266/66 |
| 2,603,475 | 7/1952 | Rotsch | 266/66 |
| 2,743,101 | 4/1956 | Clark | 266/70 |
| 2,852,245 | 9/1958 | Lamb | 266/70 |
| 3,013,787 | 12/1961 | Joslin | 266/70 |
| 3,071,361 | 1/1963 | Jacobs | 266/70 |
| 3,139,471 | 6/1964 | Root | 266/66 |
| 3,170,015 | 2/1965 | Ziebart | 266/66 |
| 3,174,736 | 3/1965 | Cameron | 266/66 |
| 3,514,087 | 5/1970 | Richards | 266/66 |
| 3,804,391 | 4/1974 | Case | 266/70 |

Primary Examiner—L. Dewayne Rutledge
Assistant Examiner—John P. Sheehan

[57] ABSTRACT

A system for using a cutting torch for making accurate curved, straight and beveled cuts. A supporting and guiding device is attached to cutting torches, which may be of various sizes and shapes, and includes an elongated bar having a ring and opposed set screw clamp at one end to receive the torch tip. A member on the elongated bar carries a workpiece engaging knife-edge wheel and supports the lower parallel tube of the torch, this member being removably mounted on and slidable along the bar to desired positions. The height bar above the wheel is adjustable for positioning the burning tip at the correct angle and spacing with respect to the workpiece. The wheel can be positioned with its plane transverse to the bar for making curved or lateral cuts, or parallel to the bar for making longitudinal straight, perpendicular or bevel cuts. A centering pin is slidably positionable on the bar for making long radius cuts. Smaller circular and other cuts are made with the use of a template having grooves in which the centering pin rides, the wheel being retracted during such operation. A method is disclosed using a template having a straight edge and keeping the torch parallel to such edge. Both the attachment and template are made of stainless steel to reduce hot metal adherence.

19 Claims, 12 Drawing Figures

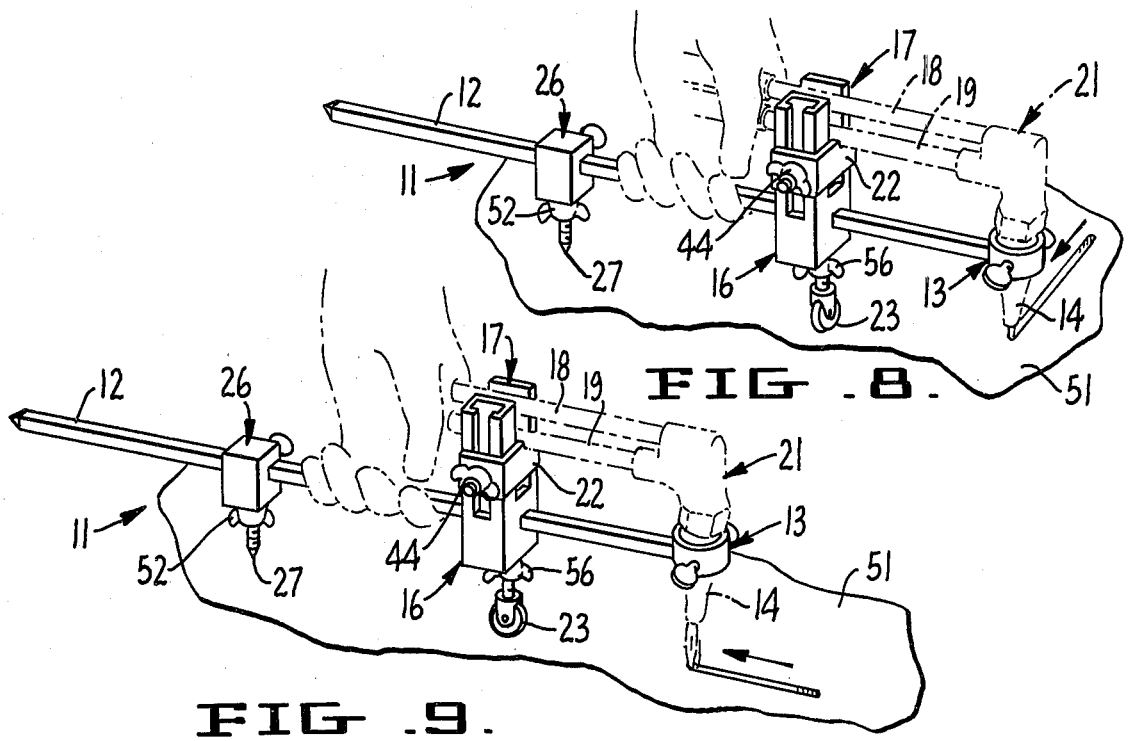
FIG. 8.
FIG. 9.
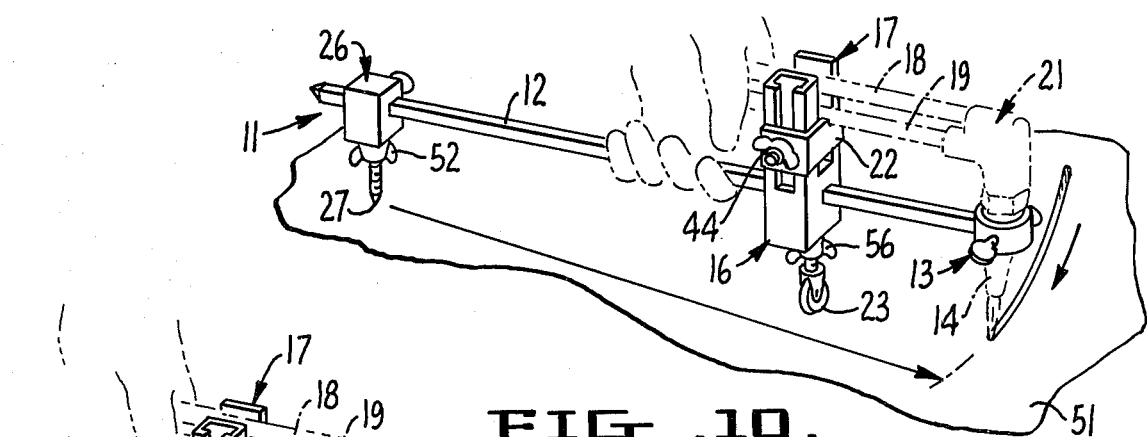
FIG. 10.
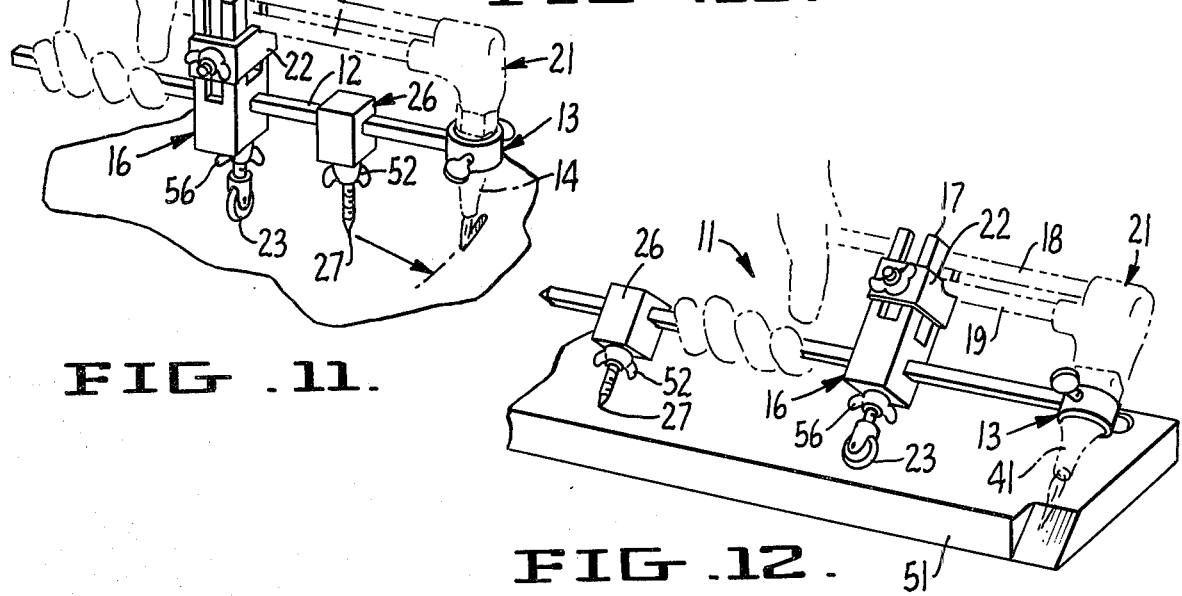
FIG. 11.
FIG. 12.

CUTTING TORCH ATTACHMENT

BACKGROUND OF THE INVENTION

1. Field of the Invention

This application relates to a CUTTING TORCH SYSTEM, and more particularly to attachments for a cutting torch for enhancing accuracy of curved, straight and beveled cuts.

2. Description of the Prior Art

Currently available cutting torch guides are quite expensive, and the more inexpensive devices are not particularly effective. Various problems observed in prior attachments include hot steel particles sticking to the tool and interfering with various adjustments thereof; the common requirement for separate, special tools to operate the adjustments; inability of the attachments to fit the wide variety of cutting torches available on the market; interference of the attachment with the operation of the torch when the attachment is not being used; and inability of the same devices to cut circles and curves of various radii, ranging from very small circles to very large curves. Typical of the prior art are the following patents:

| U.S. Pat. No. | Inventor |
|---|---|
| 1,495,994 | Farmer |
| 2,170,305 | Ingwersen |
| 2,743,101 | Clark |
| 2,852,245 | Lamb |
| 3,139,471 | Root |
| 3,170,015 | Ziebart |
| 3,514,087 | Richards |
| 3,804,391 | Case |

The cutting torch attachment of the present invention includes features of advantage and operates in modes not contemplated by the prior art.

SUMMARY OF THE INVENTION

Basically, the cutting torch attachment of the present invention includes an elongated bar upon which is mounted a clamping device for releasably holding the head of the cutting torch, and upon which is slidably, but lockably, mounted a unit having a support wheel for engaging and supporting the body of the cutting torch, a pointed member providing a center about which the device and cutting torch swings when in operation also being slidably, but lockably, mounted on the elongated bar.

Cutting torch heads or "tips" come in a variety of diameters and lengths, and the clamping device for releasably mounting these tips should be adapted to receive tips of varying diameters, and should be adapted to permit positioning of the tip so as to bring it closer to or further from the work surface. The apparatus of the present invention accommodates cutting torch tips of various diameters and provides for adjustment of the tip so as to bring it to the optimal distance from the work surface.

Because of various shapes and proportions of cutting torches currently available, it is highly desirable for the attachment to accommodate itself to the particular burning torch easily and simply. The attachment of the present invention provides for adjustment of the elongated bar with respect to the cutting torch so that the burning tip is supported in proper relation to the work surface. The entire apparatus of the present invention is adapted to be formed of stainless steel to which hot steel particles will not adhere and foul the adjusting means, thus eliminating a major source of difficulty with conventional torch attachments.

Accordingly, it is an object of the present invention to provide a cutting torch system employing a cutting torch attachment capable of supporting the torch in a manner facilitating making accurate curved, straight and beveled cuts.

Another object of the present invention is to provide an attachment of the character described which is resistant to adherence of hot steel particles and which is capable of being operated and adjusted without separate tools of any kind.

A further object of the present invention is to provide an attachment of the character set forth which is adapted for use with a wide variety of the cutting torches available on the market, and which fits under the cutting torch in a manner not interfering with conventional operation of the torch when the attachment is not being used.

A still further object of the present invention is to provide a method and apparatus for torch cutting of circles and curves of various radii, ranging from very small circles, such as $\frac{3}{8}$" diameter, to very large curves having a maximum radius limited only by the chosen length of the elongated bar.

Yet another object of the present invention is to provide a method and apparatus of the character set forth which is able to direct the cutting torch along irregular paths, both curved, straight and angular, by the use of templates.

Other objects of the present invention will in part be obvious and will in part appear hereinafter.

The present invention, accordingly, comprises the several steps and the relation of one or more such steps with respect to each of the others, and the apparatus embodying features of construction, combinations of elements, and arrangements of parts which are adapted to effect such steps, all as exemplified in the following disclosure. For a fuller understanding of the nature and objects of the present invention, reference should be had to the following detailed description, taken in connection with the accompanying drawings.

BRIEF DESCRIPTION OF THE DRAWINGS

FIG. 8 is a view similar to that of FIG. 1, but on a reduced scale, and showing the attachment being used for supporting the tip of the cutting torch in desired relation to the work piece while making a straight lateral cut.

FIG. 9 is a view taken similarly to that of FIG. 8, but showing the attachment supporting the tip of the cutting torch in desired relation to the work piece while making a straight longitudinal cut.

FIG. 10 is a view taken similarly to that of FIG. 8, but illustrating the attachment supporting the tip of a cutting tool in desired relation to the work piece while making a circular cut of large radius.

FIG. 11 is a fragmentary perspective view taken similarly to that of FIG. 10, but illustrating the attachment supporting the tip of the cutting torch in desired relation to the work piece during the making of a circular cut of relatively small radius.

FIG. 12 is a view taken similarly to that of FIG. 8, but illustrating the attachment supporting the tip of the cutting tool in desired relation to the work piece for making a bevel cut at an angle to the surface of the work piece.

Figure 1:
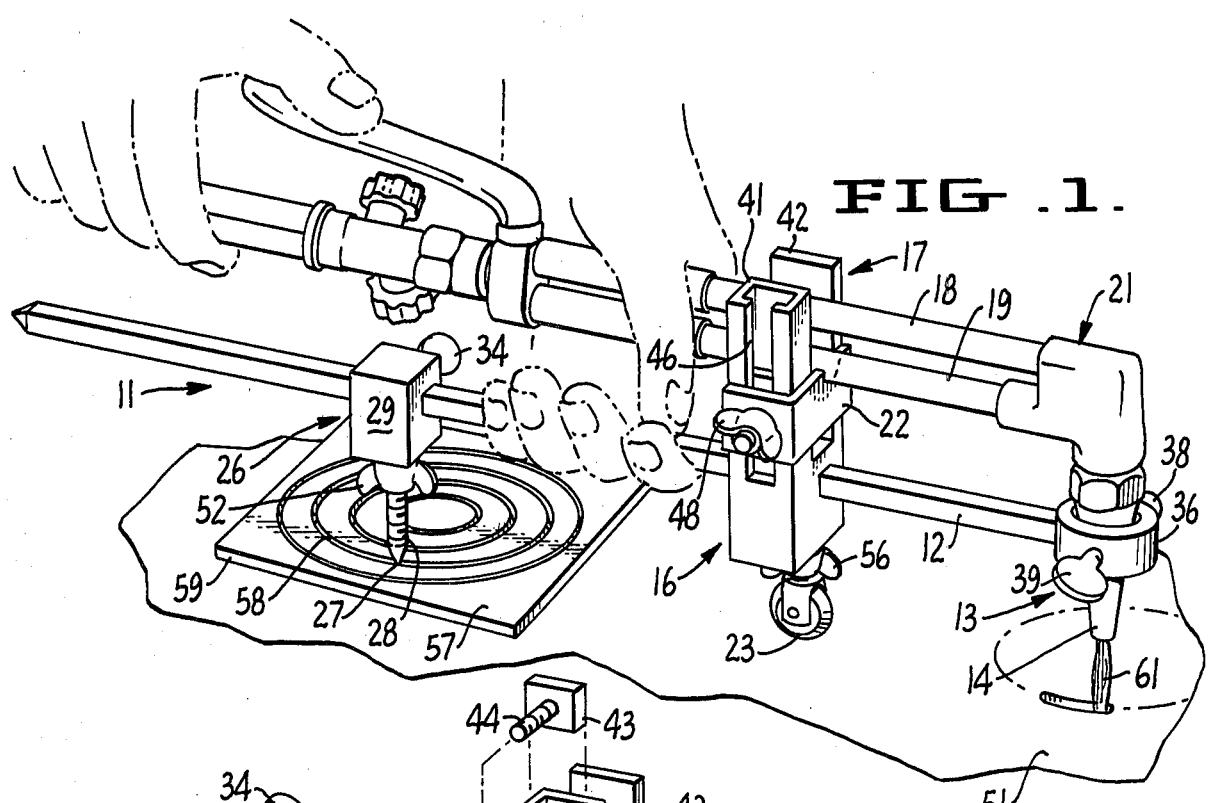
FIG. 1 is a perspective view of an attachment constructed in accordance with the present invention and mounted thereon, in operative position upon a cutting torch, the assembly as shown being employed to cut a circle by the use of a template.
Figure 2:
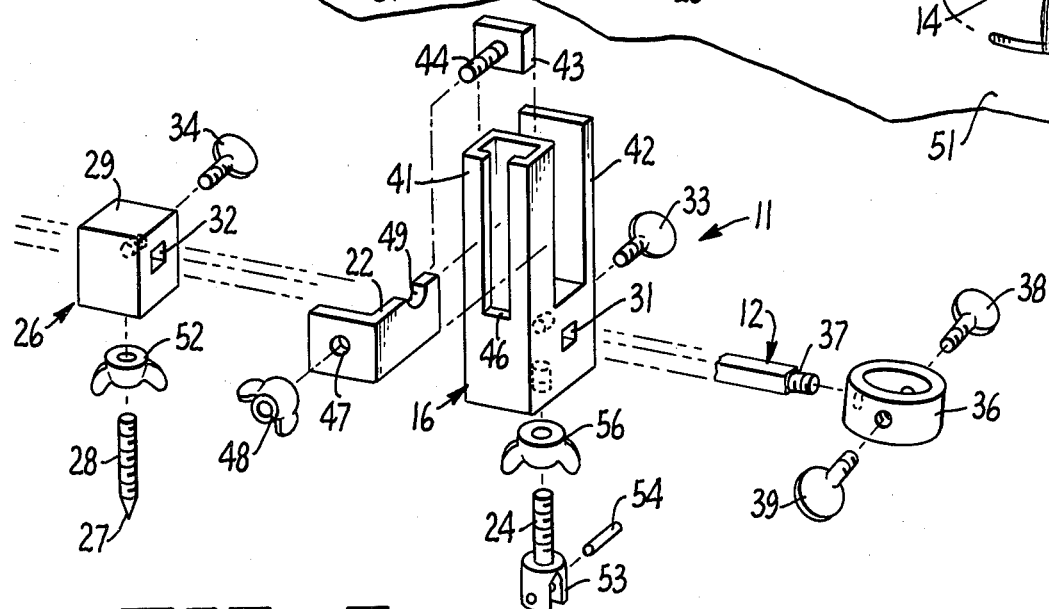
FIG. 2 is an exploded perspective view of the attachment of FIG. 1.
Figure 3:
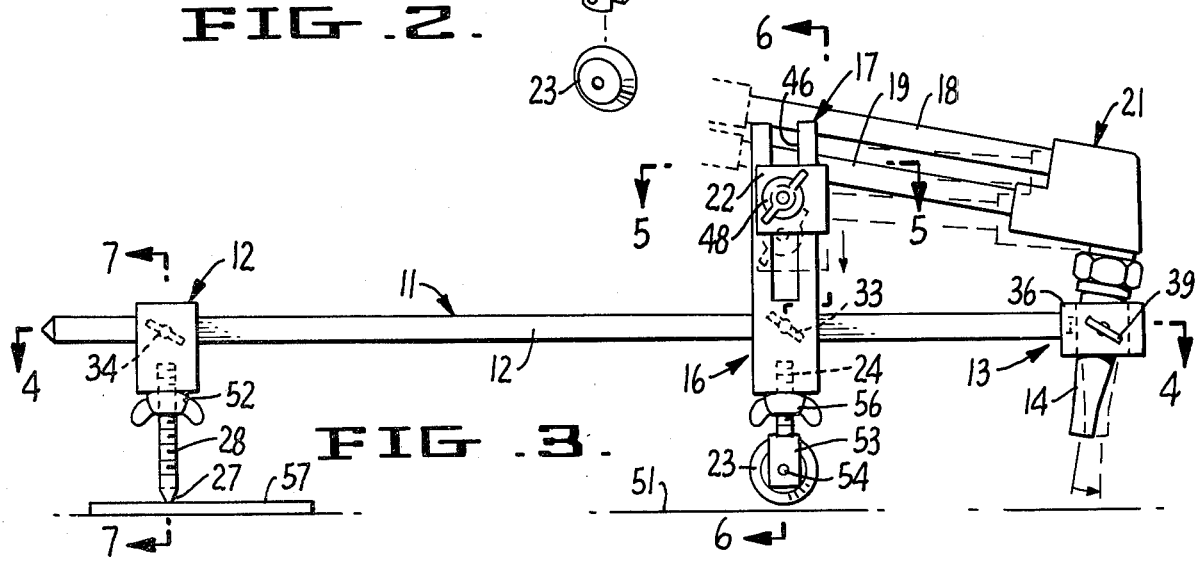
FIG. 3 is a side elevational view of the attachment of FIG. 1.
Figure 4:
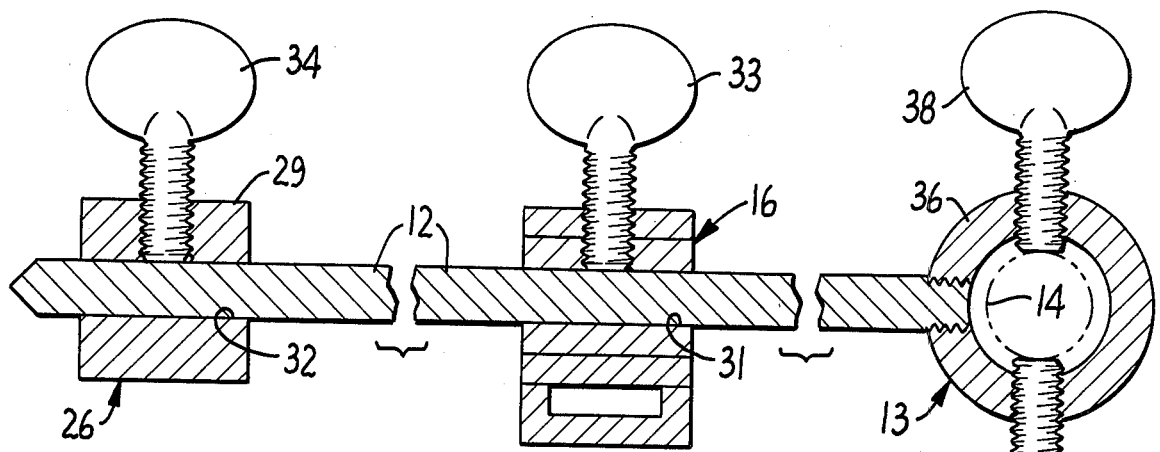
FIG. 4 is an enlarged fragmentary view taken substantially on the plane of line 4—4 of FIG. 3.
Figure 5:
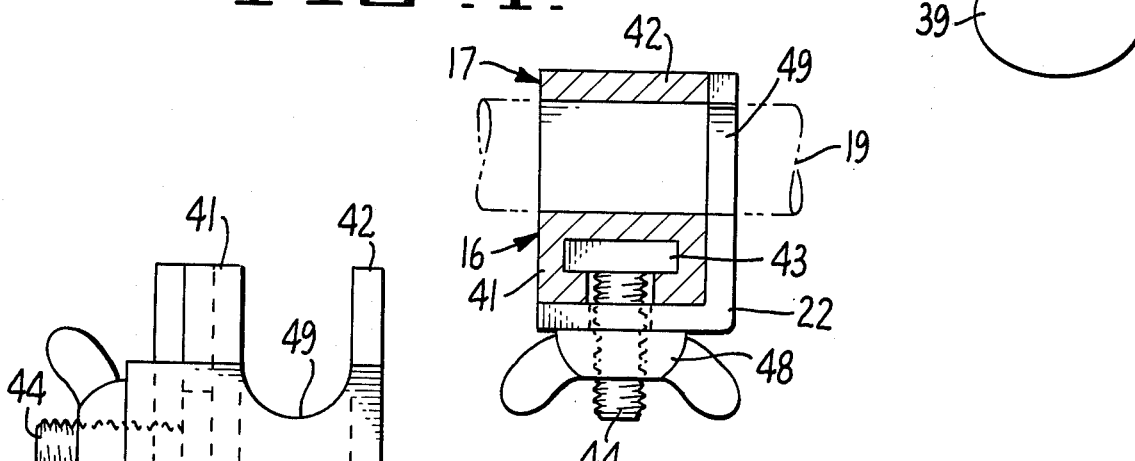
FIG. 5 is an enlarged plan sectional view taken substantially on the plane of line 5—5 of FIG. 3.
Figure 6:
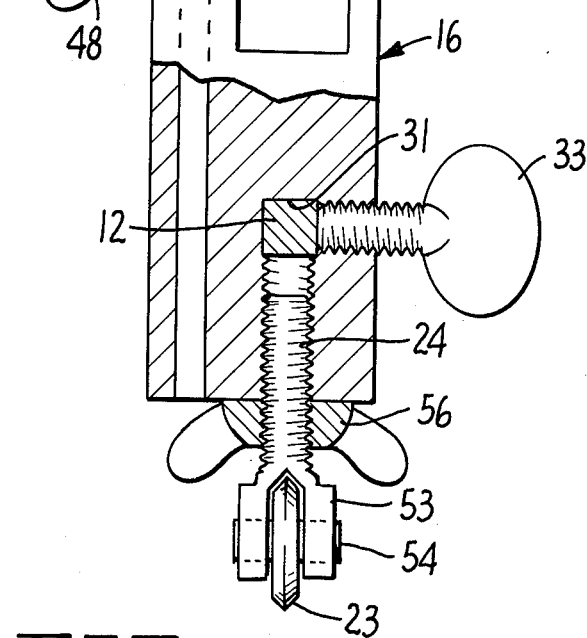
FIG. 6 is an enlarged cross-sectional view taken substantially on the plane of line 6—6 of FIG. 3.
Figure 7:
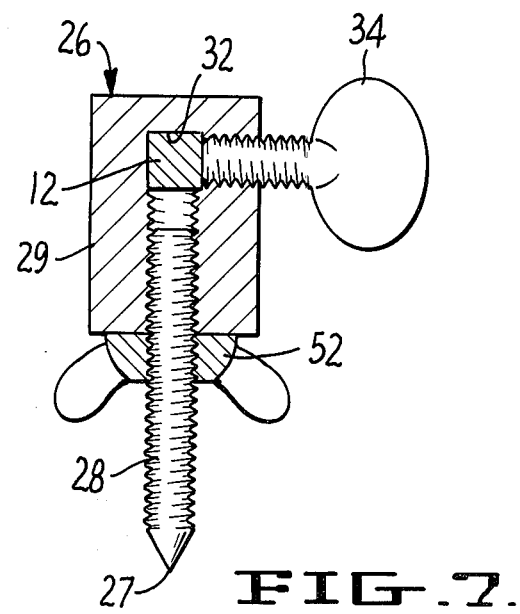
FIG. 7 is an enlarged cross sectional view taken substantially on the plane of line 7—7 of FIG. 3.

While only the preferred forms of the invention have been illustrated in the drawings, it will become apparent from the following specification and from the claims that certain modifications and changes in the structure may be made without departing from the ambit of the present invention.

DESCRIPTION OF THE PREFERRED EMBODIMENTS

The cutting torch system of the present invention includes a method for accomplishing accurate curved, straight and beveled torch cuts involving the use of an attachment for supporting the tip of the cutting torch in desired relation to the work piece during a variety of cutting operations.

The method of the present invention supporting a cutting torch in generally parallel spaced relation above an elongated bar, with the tip of the cutting torch being clamped in adjustable fixed relation to the bar, supporting the bar and the cutting torch on a member having a wheel for riding on the work piece, and also supporting the bar on a centering point.

When making a circular cut of large diameter, the centering point device is mounted toward the end of the bar opposite to the cutting torch tip, and the bar is then rotated in a horizontal plane around the centering point and supported on the wheel and centering point.

In making a circular cut of relatively small diameter, the centering point device is mounted on the bar between the cutting torch tip and the wheeled support member, with the point and wheel again offering a two point support calculated to keep the cutting tip the proper distance from the work surface as it moves along the circular path around the centering point.

When making a lateral cut, the centering point is retracted and the support wheel is turned sideways so that it supports the attachment and the cutting torch as the lateral cut is made.

In making a longitudinal cut, the centering point is also retracted and the support wheel is turned with its plane parallel to the desired direction of cut.

As a feature of the invention, the described apparatus may be used with a grooved template for making circular and noncircular cuts. In this method, a grooved template having a straight side is attached to the work piece, the support wheel is retracted, the centering point is extended, and the operator moves the centering point along the groove in the template while maintaining parallelism of the cutting torch and support bar with the straight side of the template.

In each of the described methods, the cutting torch is supported during its movements on either the centering pin or the support wheel, or both. This makes it relatively easy for the operator to maintain the proper spacing and angle of the cutting torch tip relative to the work piece.

Referring now to the drawings in detail, it will be seen that the attachment 11, of the present invention includes an elongated bar 12 of uniform cross-section, holding means 13 secured at one end of the bar 12 and adapted for clamping engagement onto a variety of burning torch tips 14 of different sizes and shapes, a support member 16 mounted on the bar 12 for adjustable positioning therealong and having an upwardly extending portion 17 adapted for receiving the parallel gas supply tubes 18 and 19 of a cutting torch 21 having its burning tip 14 clamped in the holding means 13, a positioning member 22 vertically adjustable on the upwardly extending portion 17 and formed to bear against and support the lower tube 19 of the cutting torch 21, a rotatable wheel 23 having an upwardly extending post formed for selective spacing of the wheel from the bar 12 and for selective rotative positioning of the plane of the wheel 23 about the axis of the post 24, and a centering point device 26 having a downwardly directed point 27 on a vertically extending shank 28 carried by a keeper 29 formed for adjustable positioning along the bar 12 whereby vertical movement of the shank 28 in the keeper 29 adjustably positions the spacing of the point 27 with respect to the bar 12.

The bar 12 is of non-circular cross-section, here shown as being of square cross-section, and the support member 16 and centering point device 26 are formed with bores 31 and 32 of complimentary shape for permitting sliding adjustment of the support member 16 and centering point device 26 along substantially the entire length of the bar, locking means 33 and 34 being provided for releasably retaining the support member 16 and centering point device 26 at desired positions along the bar. For easy manual locking without requiring separate or special tools, the locking means 33 and 34 are here in the form thumbscrew set screws.

In accordance with the present invention, the holding means 13 is adapted to secure various types and sizes of burning torch tips 14 to the end of bar 12 at desired angles thereto. For this purpose, the holding means 13 here includes an angular ring 36 attached to an end 37 of the bar 12 and a pair of thumbscrews 38 and 39 vertically engaged through the ring 36 in confronting alignment and with the axes of the thumbscrews transversely perpendicular to the bar 12.

Ring 36 is of a diameter large enough to accommodate the largest of the cutting torch tips with which the attachment 11 is intended for use, and the thumb screws 38 and 39 are of a length sufficient to engage the smallest diameter cutting torch tips with which the attachment is intended for use. When the essentially tubular tip is clamped between the inner ends of thumbscrews 38 and 39, they provide a pivot about which the tip may be rocked as the cutting torch 21 is moved up and down with respect to the bar 12.

The upwardly extending portion of the support member 16 is bifurcated to provide upstanding legs 41 and 42 spaced apart by a distance sufficient to accommodate therebetween the largest parallel gas supply tubes 18 and 19 of the cutting torches 21 with which said attachment is intended for use. The positioning member 22 here comprises a clip slidably engaging the upstanding legs 41 and 42 and having a clamp comprising a keeper 43 slidable within the hollowed out leg 41 and having a stud 44 extending through a slot 46, the distal end of stud 44 passing through a bore 47 in the clip 22 for threadable engagement with a wing nut 48. Loosening of wing nut 48 permits the keeper 43 and clip 22 to move upwardly or downwardly as desired.

Clip 22 extends across the opening between the bifurcated legs 41 and 42 and is provided with a relieved portion 49 upon which rests the lower tube 19 of the cutting torch 21. When the positioning member 22 is moved to the correct height, for proper angle of the cutting tip with respect to the underlying work piece 51, the thumbscrew 48 is tightened to hold the parts in this adjusted position.

In accordance with the present invention, the centering point 27 is vertically adjustable with respect to the bar 12 to accommodate the different modes of use described above. For this purpose, the post 28 is threadably engaged with the support member keeper 29 so that rotation of post 28 will accomplish the desired selective spacing of the point 27 from the bar 12, post 28 being held in the desired position by a thumb nut 52 which acts as a manually operable lock nut.

Also in accordance with the present invention, the rotatable wheel 23 is vertically and directionally adjustable with respect to the bar 12 according to the desired mode of use of the attachment 11. The upwardly extending post 24 is threadably engaged with the support member 16 to permit rotation of wheel 23 about the axis of post 24 between a position in which the plane of wheel 23 is perpendicular to bar 12 and a second position in which the plane of wheel 23 is parallel to bar 12, and to provide for vertical adjustment of the point 27.

As a feature of the present invention, the wheel 23 tapers to a razor edge so as to be less affected by debris and irregularities on the upper surface of the work piece 51. As here shown wheel 23 is carried in fork 53 secured to the bottom end of post 24, the wheel 23 being journalled on a pin 54 passing through the opposite sides of the fork 53. A thumb nut 56 threadably mounted on post 24 functions as a manually operable lock nut to retain the wheel in the desired position and orientation.

In the mode of use illustrated in FIG. 8 of the drawings, the point 27 is retracted upwardly so that, when the attachment 11 rests on wheel 23 and the assembly is rocked to place the burning torch tip 14 the desired distance from the work piece 51, the point 27 will be spaced above the upper surface of the work piece. In this mode, the post 24 is axially rotated so that the plane of wheel 23 is perpendicular to the bar 12. In this configuration, the cutting torch 21 and attachment 11 may be moved to one side or the other for making the transverse cut as illustrated.

In the mode of operation illustrated in FIG. 9, point 27 is retracted and wheel 23 is extended, the post 24 being rotated so that the plane of wheel 23 is parallel to the bar 12. In this mode, when the cutting torch tip 14 is the correct distance from the upper surface of the work piece 51, the point 27 will be raised above such surface, and the operator can then make the longitudinal cut illustrated.

In the mode of operation illustrated in FIG. 10, the centering point 27 is extended into contact with the upper surface of work piece 51 at a desired location defining the locus of a circular cut having as its radius the distance between point 27 and the cutting tip 14. In this configuration, the wheel 23 also is extended so that the attachment 11 is supported on both point 27 and wheel 23, insuring good accuracy in making the curved cut illustrated.

The mode of operation for making cuts of comparatively small diameter is illustrated in FIG. 11. As there shown, the centering point device 26 and the support member 16 have been removed from the bar 12 and replaced upon the bar with the centering point device 26 between the support member 16 and the cutting torch tip 14. As in the configuration shown in FIG. 10, both the point 27 and wheel 23 are extended and both provide support for the attachment 11 and the cutting torch 21 carried thereon.

The mode of operation for making beveled or slanting cuts is illustrated in FIG. 12 of the drawings. As there shown, both the point 27 and wheel 23 are extended and the entire unit is tipped to the side by the desired amount. Because of this tipping, it would be difficult for the operator to maintain both the angle and the direction of cut and the distance of the cutting tip 14 from the upper surface of the work piece 51 if the entire unit were supported only on wheel 21. However, in the described configuration, the point 27 is moved lightly along the work piece and, together with wheel 23, provides improved accuracy of making the beveled cut by affording better support for the cutting torch 21.

As an important feature of the present invention, the described attachment 11 is capable of use with a template 57 having grooves 58 in its upper surface defining the size and shape of the cut to be made in the workpiece 51. The template mode of operation is particularly suited for cutting irregular shapes and circles of relatively small diameter. It should be apparent, however, that any desired shape of cut may be accomplished by the use of the present device with a suitably inscribed template 57.

As illustrated in FIG. 1 of the drawings, the grooves 58 are provided in the form of concentric circles, which may be of equally increasing increments. The wheel 23 is retracted and the entire unit is balanced on point 27 which is engaged in the desired groove 58. At least one edge 59 of the template is straight, or a straight line is provided on the template, and the bar 12 is held parallel to the straight edge or straight line as the unit is manipulated so that the point 27 slides along the groove in which it is engaged. By keeping the bar 12 parallel to the straight edge or straight line, the cutting flame 61 will follow a path of similar size and shape.

It should be noted that all of the parts are particularly designed for fabrication from stainless steel so that the entire attachment 11 will be resistant to adherence of hot steel particles resulting from the burning operation. It should also be noted that the various parts of the attachment 11 are formed and proportioned so as not to interfere with conventional use of the cutting torch when, for any reason, the attachment 11 is not used. In the latter circumstance, both point 27 and wheel 23 are moved to their retracted positions.

From the foregoing, it will be seen that the cutting torch system of the present invention provides an apparatus capable of use with a wide variety of cutting torches and tip configurations, without interfering with conventional use of the cutting torch, and when in use providing greatly improved accuracy of cutting and burning operations.

What is claimed is:

1. An attachment for supporting the tip of a cutting torch in desired relation to the work piece during a variety of cutting operations, comprising:
   an elongated bar of uniform cross-section,
   holding means secured at one end of said bar and adapted for clamping engagement onto a variety of burning torch tips of different sizes and shapes,
   a support member mounted on said bar for adjustable positioning therealong and having an upwardly extending portion adapted for receiving the parallel gas supply tubes of a cutting torch having its burning tip clamped in said means,
   a positioning member vertically adjustable on said upwardly extending portion and formed to bear against and support the lower tube of the cutting torch,
   a rotatable wheel having an upwardly extending post engaged with the lower end of said support member and formed for selective spacing of said wheel from said bar and for selective rotative positioning of the plane of said wheel about the axis of said post, and
   a centering point device having a downwardly directed point on a vertically extending shank carried by a keeper formed for adjustable positioning along said bar, whereby vertical movement of said shank in said keeper and said post in said support member adjustably positions the spacing and angle of said torch tip with respect to said bar.

2. A cutting torch attachment as described in claim 1, and wherein said bar is of non-circular cross-section, and said support member and said centering point device are formed with bores of complementary shape for permitting sliding adjustment thereof along substantially the length of said bar, locking means being provided for releasably retaining said support member and said centering point at desired positions along said bar.

3. A cutting torch attachment as described in claim 2, and wherein said locking means comprises manually operable set screws.

4. A cutting torch attachment as described in claim 1, and wherein said holding means comprises:
   a circular ring attached to an end of said bar,
   and a pair of thumbscrews threadably engaged in confronting alignment and with the axes of said thumbscrews transversely perpendicular to said bar,
   said ring being of a diameter large enough to accommodate the largest of cutting torch tips with which said attachment is intended for use, and
   said thumbscrews being of a length sufficient to engage the smallest of cutting torch tips with which said attachment is intended for use.

5. A cutting torch attachment as described in claim 4, and wherein said positioning member is vertically adjustable on said upwardly extending portion of said support member for supporting the cutting torch at a desired angle to said bar.

6. A cutting torch attachment as described in claim 5, and wherein said upwardly extending portion of said support member is bifurcated to provide upstanding legs spaced apart by a distance sufficient to accommodate therebetween the largest parallel gas supply tubes of the cutting torches with which said attachment is intended for use.

7. A cutting torch attachment as described in claim 6, and wherein said positioning member is a clip slidably engaging said upstanding legs, and having a thumb nut clamp for securing said clip at a desired height to provide said desired angle of said cutting torch to said bar.

8. A cutting torch attachment as described in claim 1, and wherein said upwardly extending post of said rotatable wheel is threadably engaged with said support member for effecting said selective spacing of said wheel from said bar and said positioning of said wheel, whereby said wheel may selectively be adjusted to track parallel with respect to and transversely with respect to said bar and the cutting torch supported thereon.

9. A cutting torch attachment as described in claim 8, and wherein a manually operable lock nut is threaded on said post for releasably securing said post against rotation in said support member.

10. A cutting torch attachment as described in claim 1, and wherein said centering point device shank is vertically adjustable on said keeper for raising and lowering said point with respect to said bar and the cutting torch supported thereon.

11. A cutting torch attachment as described in claim 10, and wherein said centering point device shank is threadably engaged with said keeper, and a manually operable lock nut is threaded on said shank for releasably securing said shank from rotation in said keeper so as to hold said point a desired distance below said bar.

12. An attachment for supporting the tip of a cutting torch in desired relation to the workpiece during a variety of cutting operations, comprising:
   an elongated bar of uniform non-circular cross-section,
   holding means secured at one end of said bar and adapted for clamping engagement on a variety of burning torch tips of different sizes and shapes,
   a support member mounted on said bar for adjustable positioning therealong and having an upwardly extending bifurcated portion providing vertically extending legs adapted for receiving the parallel gas supply tubes of a cutting torch having its burning tip clamped in said means,
   a positioning member vertically adjustable on said bifurcated portion and formed to bear against and support the lower tube of the cutting torch at a desired angle to said bar,
   a knife edge wheel journaled at the lower end of a fork member having an upwardly extending post threadably engaged with said support member for selective spacing of said wheel from said support member and for selective rotative positioning of the plane of said wheel about the axis of said post, and
   a centering point device having a downwardly directed point on a vertically extending shank threadably engaged in a keeper formed for adjustable positioning along said bar whereby rotation of said shank in said keeper adjustably positions the spacing of said point with respect to said bar.

13. A cutting torch attachment as described in claim 12, and wherein said centering point device and said support member are slidable along and removable from said bar, and manually operable set screws are threaded into said support member and said keeper to bear against said bar for releasably securing said centering point and said wheel at desired positions therealong.

14. A cutting torch attachment as described in claim 13, and wherein said centering point and said wheel are selectively positionable at similar and different spacings from the cutting torch supported on said attachment whereby the torch with the attachment thereon is usable for cutting straight and curved lines and bevels.

15. A cutting torch attachment as described in claim 1, and wherein a template having grooves therein for slidably receiving said centering point is provided, said template being securable at desired locations to a workpiece.

16. A cutting torch attachment as described in claim 15, and wherein said template is formed to provide a series of concentric circular grooves of graduated size for the cutting of circular holes.

17. A cutting torch attachment as described in claim 15, and wherein said template is of stainless steel, and said mounting means comprises a plurality of magnets attached thereto.

18. A cutting torch attachment as described in claim 1, and wherein said attachment is made of stainless steel for reducing adherence of metal heated by said cutting torch.

19. An attachment for supporting the tip of a cutting torch in desired relation to the work piece during a variety of cutting operations, comprising:
an elongated bar of uniform cross-section,
holding means secured at one end of said bar and adapted for clamping engagement onto a variety of burning torch tips of different sizes and shapes,
a support member mounted on said bar for adjustable positioning therealong,
a rotatable wheel having an upwardly extending post engaged with the lower end of said support member and formed for selective spacing of said wheel from said bar and for selective rotative positioning of the plane of said wheel about the axis of said post, and
a centering point device having a downwardly directed point on a vertically extending shank carried by a keeper formed for adjustable positioning along said bar.

* * * * *